UNITED STATES PATENT OFFICE.

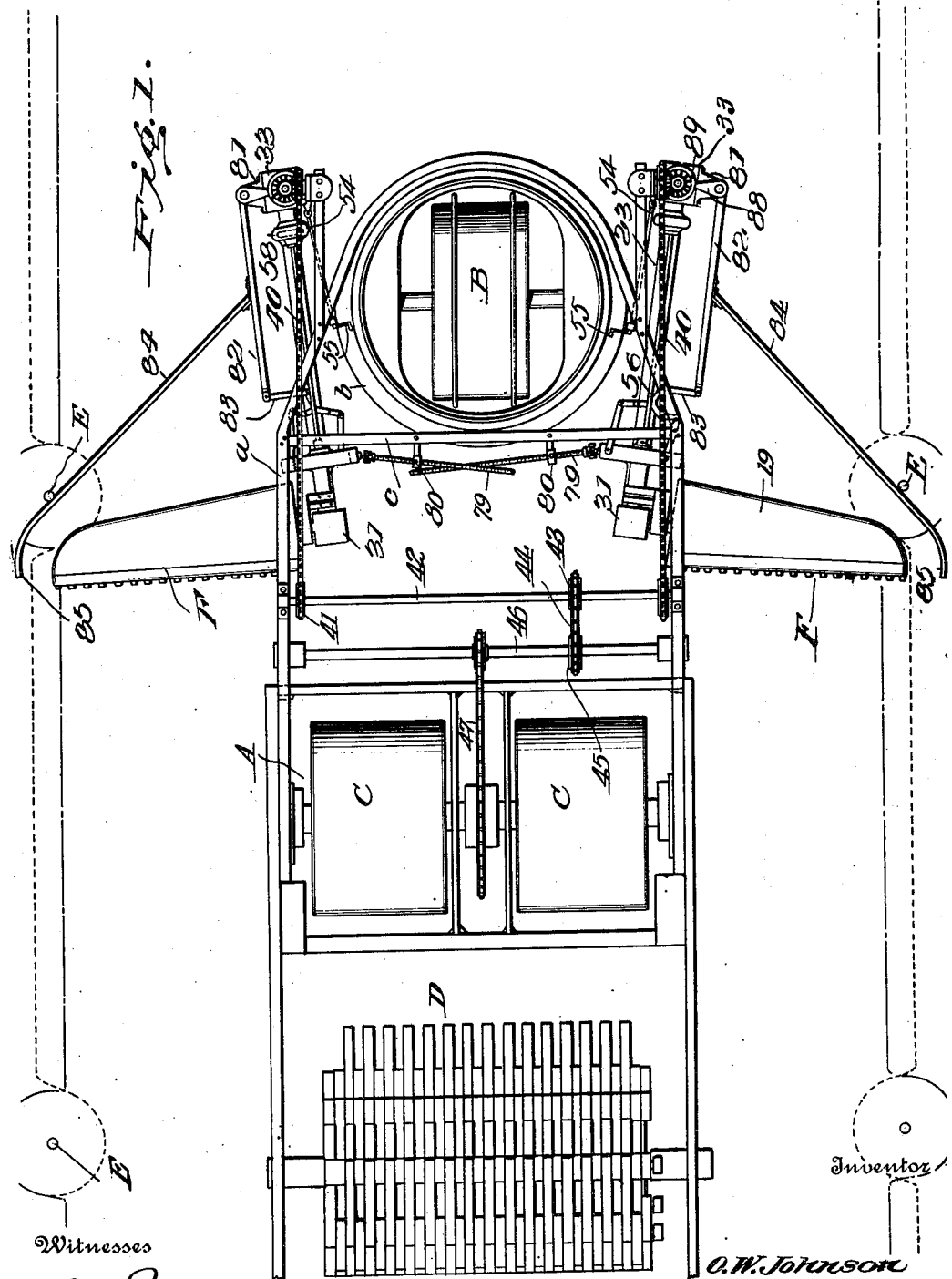

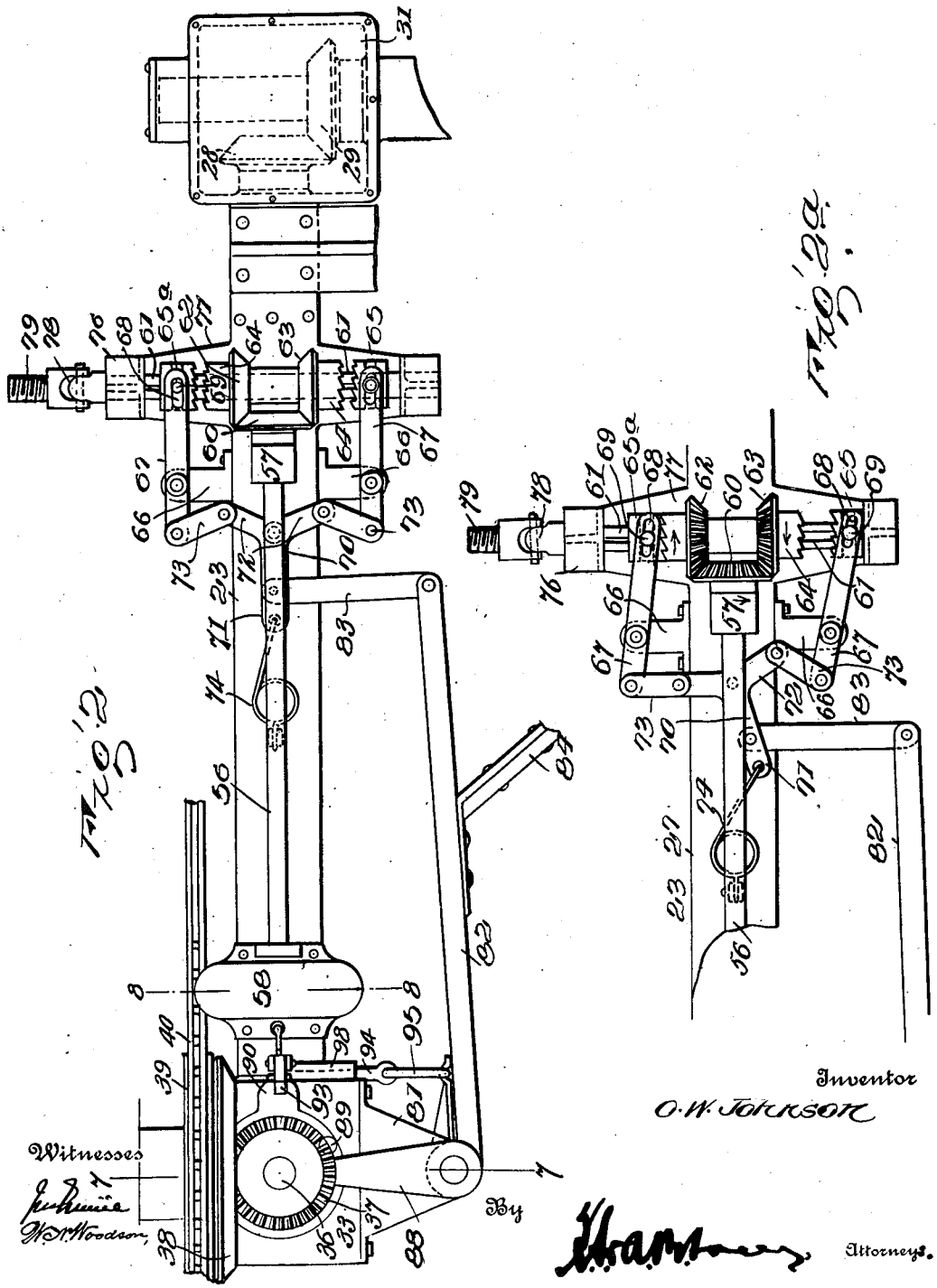

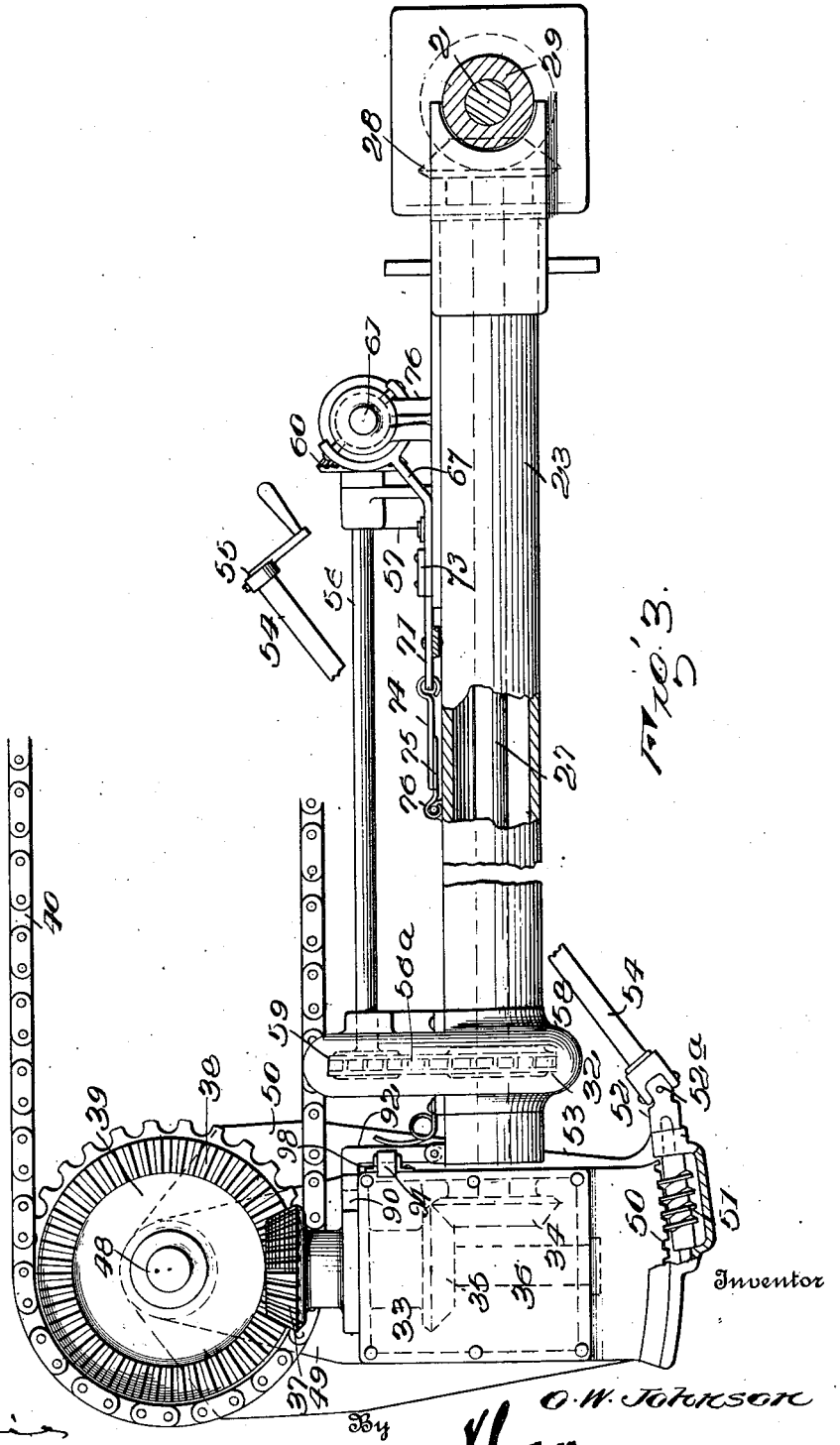

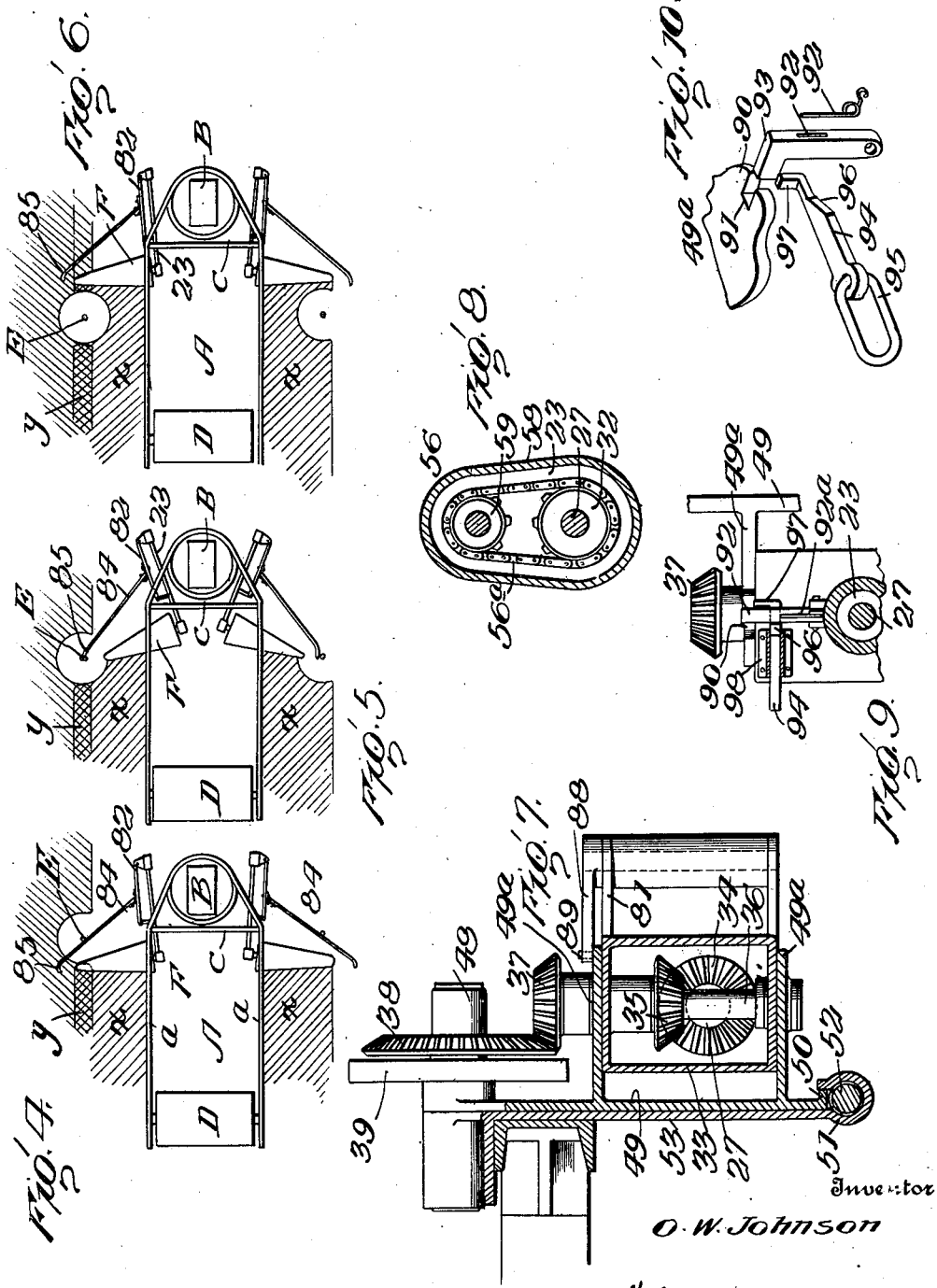

OLIVER WARREN JOHNSON, OF CLEVELAND, OHIO.

AUTOMATIC CULTIVATOR ATTACHMENT FOR PLOWS.

1,307,672.  Specification of Letters Patent.  Patented June 24, 1919.

Application filed April 18, 1914, Serial No. 832,997. Renewed November 23, 1918. Serial No. 263,936.

*To all whom it may concern:*

Be it known that I, OLIVER W. JOHNSON, citizen of the United States, residing at Cleveland, in the county of Cuyahoga and State of Ohio, have invented certain new and useful Improvements in Automatic Cultivator Attachments for Plows, of which the following is a specification.

My invention relates to agricultural implements, and particularly to rotary cultivators.

In cultivating vineyards, orchards and the like, it is of course necessary that the middle space between the rows of trees or vines should be cultivated, and that the space between the trees of each line should also be cultivated. This is impossible today with any plow or cultivator known to me, particularly plows or cultivators which are operated by tractors, and the object is only partially achieved by running the cultivator back and forth across the orchard or vineyard in one direction and then, if the trees are far enough apart, running the cultivator or plow back and forth across the orchard at right angles to the direction in which it was first operated.

The general object of my invention is to provide a cultivating attachment adapted to be used with a tractor drawn rotary plow, and so constructed that while the main plow is cultivating the avenue between two lines of trees or vines, the attachment will cultivate the space between each two trees or vines of a row and thus cultivate the avenue of grapes or trees at one operation or trip through the avenue and cultivate the whole space between the rows of grapes or trees as well as a few inches beyond each vine or tree into the next row so that when returning down the next row, the cultivators will reach over and thus completely cultivate all of the ground around the vines or trees except a small circle just at the tree or vine itself.

A further object of the invention is to provide an attachment of this character adapted to be mounted in connection with a rotary plow and to provide two laterally projecting cultivators projecting out beyond the line of action of the plow and also to provide means whereby these laterally projecting cultivators may be retracted to a proper extent as they approach a vine or tree to permit the cultivators to circulate around the tree and then projected again beyond the line of trees or vines after the cultivators have passed each particular tree or vine.

Another object is to provide means whereby the cultivators may be manually elevated or lowered into an active or negative position, or adjusted so that the depth of cut may be regulated.

A further object of the invention is to provide a cultivator attachment of the character heretofore described particularly adapted to be used with a rotary plow, such as the plow illustrated and described in my pending application, Serial No. 756,476, filed on the 24th day of March, 1913.

A further object of the invention is to provide a cultivator so arranged that it will work outside of the supporting frame and wheels instead of between the supporting frame and wheels as is usual.

Still another object is to provide a rotary cultivator supported at one end only, the other end being free to run under vines and branches and in low places, impossible with any other form of cultivator.

Other objects will appear in the course of the following description.

My invention is illustrated in the accompanying drawings wherein:

Figure 1 is a general plan view of a tractor, a rotary plow used in connection therewith, and my cultivating attachment.

Fig. 2 is a fragmentary plan view of the cultivator operating mechanism.

Fig. 2ª is a like view to Fig. 2 but showing the operating mechanism in one of its shifted positions.

Fig. 3 is a side elevation of the construction shown in Fig. 2.

Figs. 4, 5 and 6 are diagrammatic plan views showing the operation of the cultivator in connection with an orchard or vineyard.

Fig. 7 is a fragmentary section on the line 7—7 of Fig. 2.

Fig. 8 is a section on the line 8—8 of Fig. 2.

Fig. 9 is a detail sectional view of the means for locking the arm 23.

Fig. 10 is a fragmentary elevation of said locking means applied to the casing 36.

Corresponding and like parts are referred to in the following description and indicated in all the views of the accompanying drawings by the same reference characters.

Referring to these drawings, A designates a tractor of any suitable form, it being understood that I have illustrated this tractor diagrammatically and that I am not in any way limited to this particular form of tractor. The tractor as shown consists of a frame supported upon a forward wheel B of any usual or suitable form and having the rear rollers or wheels C. Supported upon the tractor frame and disposed rearward of the latter is the rotary plow D which may be also of any suitable form and may conveniently have the form illustrated in my previously-mentioned pending application.

The frame of the tractor is shown as including the side bars or arms a which extend partially around the circular frame b inclosing the wheel B, the sides of the frame extending rearward and supporting the bearings for the shaft of the wheels C. The wheels C are preferably the traction wheels of the device and are to be driven by any suitable engine (not shown). A cross bar c connects the arm a.

A rotary cultivator F projects from each side of the tractor and is partly covered by a hood 19.

Each cultivator is supported upon the extremity of a hollow or tubular arm 23 which at one end is pivotally mounted upon the supporting frame of the machine.

Passing longitudinally through the hollow arm 23 is a shaft 27 upon one extremity of which is the bevel gear wheel 28 meshing with a bevel gear wheel 29 whereby to actuate the shaft 2 carrying the cultivator or ground engaging implement, said gears being housed in a casing 31 carried upon the arm 23 and supporting the inner end of the shaft 2. The shaft 27 extends forward through the arm 23 and at one point in its length is provided with a sprocket wheel 32 which as will hereafter be explained, co-acts with a sprocket wheel on a shaft whereby the mechanism for shifting the cultivators is actuated. The extreme forward end of the shaft 27 extends into a casing 33 and carries a bevel gear wheel 34 which meshes with a bevel gear wheel 35 on a vertical shaft 36 supported in suitable bearings in the said casing. This shaft 36 also carries upon its upper end the bevel gear wheel 37 which meshes with the beveled toothed face 38 of a sprocket wheel 39. A driving sprocket chain 40 passes over this sprocket wheel 39 and extends rearward as shown in Fig. 1 to a sprocket wheel 41 mounted upon a shaft 42, which in turn carries a sprocket wheel 43 engaged by a sprocket chain 44 passing over the sprocket wheel 45 on a main driving shaft 46 which may be connected to the engine in any suitable manner. This shaft 46 is connected to the traction wheel C in any suitable or desired manner as by means of the sprocket chain 47.

It will now be seen that a rotation of the shaft 42 drives the wheel 39 and this wheel through the described intermediate gearing drives the shaft 27 constantly in one direction. The shaft 27 in turn rotates the corresponding shaft 2 and the corresponding cultivator.

It is to be noted that the shaft 48 upon which each sprocket wheel 39 is mounted is a stub shaft projecting out from the frame of the machine, and that the casing 33 is connected to this stub shaft by an upwardly extending bracket 49 which is pivotally or swingingly supported upon the shaft 48 and that when the angular direction of this bracket 49 is changed, the arm 23 and the cultivator carried thereby will be raised or lowered.

The bracket plate 49, as illustrated in Fig. 7, is provided with the outwardly projecting upper and lower plates or flanges 49ª between which the casing 33 is pivotally mounted for swinging movement in a horizontal plane by means of the shaft 36 which acts as the pintle for said casing.

For the purpose of changing the angular direction of the arm 23 and, therefore, of the cultivator, I have illustrated the lower end of the bracket 49 as provided with teeth 50 adapted to be engaged by a worm 51 mounted upon a shaft 52, this shaft being supported in suitable bearings in the lower end of a plate 53 extending down from and forming part of the frame of the machine, the bracket 49 bearing at all times against this plate so as to be firmly supported.

The shaft 52 is connected by means of a universal joint 52ª to a shaft 54 which extends to any convenient point, and is supported in suitable bearings and is provided with a crank handle 55 whereby it may be manually rotated. It will be obvious that by turning this shaft 54 the bracket supporting the casing 33 will be shifted rearward or forward and that this will act to raise or lower the arm 23 and thus raise or lower the cultivator.

The mechanism whereby the arm 23 is automatically shifted outward so as to project the cultivators into the space between the trees of a line of trees or vines, and retract the cultivators before they can strike the trees or vines so that they can pass around is as follows.

Referring now to Figs. 2 and 3, it will be seen that above the arm 23 and extending parallel thereto is a shaft 56 which is mounted at its rear end in a bearing bracket 57 on said arm and at its forward end in a casing 58. This casing 58 forms an enlargement of the arm 23 to accommodate the sprocket wheel 32 carried on the shaft 27 as shown clearly in Fig. 3, and also houses a sprocket wheel 59 mounted upon the shaft 56. A sprocket chain 56ª connects these sprocket wheels 59 and 32 so that the shaft 56 will be driven from the shaft 27 constantly in one direction. At its rear end the shaft 56 carries a bevel wheel 60.

Supported in suitable bearings upon the arm 23 and at a right angle to the shaft 56 is a shaft 61. Loosely mounted upon this shaft 61 are the oppositely disposed bevel gear wheels 62 and 63 which mesh with the bevel gear wheel 60. The hubs 64 of these gear wheels 62 and 63 are formed with clutch teeth and splined upon the shaft 61 are the sliding clutch elements 65 and 65ᵃ engageable respectively with the clutch toothed hubs of the gear wheels 63 and 62 but slidable out of engagement therewith.

Projecting from the arm 23 in opposite directions in advance of the bearings for the shaft 61 are the brackets 66, and mounted upon these brackets are the shipper levers 67. One extremity of each of these levers is slotted, as at 68, for engagement with a pin 69 whereby to slide the clutch element upon the shaft 61 in a well-known manner.

Pivotally mounted upon the upper face of the arm 23 is a three-armed lever 70, as shown clearly in Fig. 2. This lever has a middle arm 71 which lies in a plane approximately parallel to the arm 23 and has the laterally projecting arms 72 which are connected by means of links 73 to the adjacent extremities of the shipper levers 67. It will thus be seen that when the lever 70 is rocked upon its pivotal point, one of the shipper levers 67 will shift its clutch element 65 or 65ᵃ into engagement with the hub of the corresponding bevel gear wheel while the other shipper lever will shift its clutch element out from engagement with its corresponding bevel gear wheel, as shown clearly in Fig. 2ᵃ. The arm 71 is connected to a spring 74 which is designed to urge the arm 71 into the position shown in Fig. 2ᵃ and to yieldingly resist the inward movement of said arm.

The shaft 61 after it passes through the bearing 76 on the bracket 77 projecting from the arm 23 is connected by means of a universal joint 78 to a screw shaft 79. This screw shaft 79, as illustrated in Fig. 1, passes through a nut 80 held from rotation in any suitable manner and mounted upon the cross bar c. It will thus be obvious that when the shaft 79 is rotated in one direction it will cause the rear end of the arm 23 to be drawn inward and that when rotated in the opposite direction it will cause said end of the arm 23 to be forced outward. This inward and outward movement of the arm 23 is automatically controlled by the instrumentalities which will now be described.

Projecting from the casing 33 is a bracket 81 upon which is pivotally mounted an arm 82 which extends rearwardly approximately parallel to the arm 23 but is independently movable with relation thereto and is connected at its rear end by means of a link 83 with the arm 71 of the lever 70. Projecting from this arm 82 is a controlling finger 84 which projects rearwardly and outwardly to a point laterally beyond and approximately in line with the outer end of the hood 19 as shown in Fig. 1 and is there slightly curved as at 85. This finger 84 is adapted to engage with a tree or vine indicated by the letter E. When it contacts with this tree or vine as indicated in Figs. 1 and 4, it and the rear end of the arm 82 will be forced inward and thereby swing lever 70 into such position that the outer clutch member 65 will be shifted into engagement with the hub of the gear wheel 63, the resistance offered by the tree exerting sufficient force to swing the lever 70 inward beyond the positions shown in Fig. 2. The power applied through the bevel gear 60 will under these circumstances rotate the shaft 79 in such direction that its engagement with the corresponding nut 80 will cause the shaft to be drawn laterally inward thus drawing in the arm 23 and drawing the cultivator inward of the line of trees or vines. This inward movement of the cultivator will be continued until the finger 84 escapes the tree or vine as indicated in Fig. 5. The minute the finger 84 passes the tree or vine, it will be released and the spring 74 will act to shift the parts to the position shown in Fig. 2ᵃ, thus shifting the clutches into such position as to reverse the motion of the shafts 61 and 79, and thereby causing outward movement of the arm 23 and the cultivator connected thereto.

In order to limit the outward movement of the arm 23 and therefore limit the outward movement of the cultivator, I provide mechanism which automatically prevents the arm 82 swinging out from the tractor beyond a predetermined distance and yet leaves this arm free to swing inward toward the tractor.

While I do not wish to be limited to any specific mechanism for this purpose, I have shown a latch mounted upon the arm 23 and coacting with a keeper mounted upon the bracket 49. As shown in Figs. 9 and 10, the keeper is provided by forming an enlargement 90 upon the bracket, this enlargement being notched or slotted as at 91.

Pivotally mounted in ears formed upon the arm 23 near the base of the arm or in any other suitable manner, is the latch 92 which is illustrated as angular in form and having a detent tooth 93 adapted to engage in the notch 91. It is, of course, necessary to provide means for forcing this latch 92 out of engagement with the keeper upon the inward movement of the arm 82 relative to the arm 23, and to this end I provide a wedging member 94 which engages between the latch 92 and the face of the casing 33, this wedging member being connected by means of a link 95 to the arm 82. The wedging member has a wedging face 96 which is relatively short and steep in pitch and which engages the inside face of the latch 92, and the extremity of the wedging member 94 is provided with an upstanding lug or stop 97 so disposed as to bear against the inner side of the tooth 93. The wedging member is mounted in a casing 98 through which it slides.

The stoppage of the outward swing of the arm 82 by the stop 97 accomplishes another function. It limits the outward movement of the arm 23 but it does this indirectly by limiting the outward movement of the arm 82.

When the arm 82 moves inward, by reason of the finger 84 impinging against a tree or vine, as before stated, the wedging member or trip 94 is, of course, moved inward and immediately disengages the latch 92 from the notch 91 so that the arm 23 is free to swing inward under the action of the screw shaft 79, the link 83 pushing the lever 70 over beyond the position shown in Fig. 2, so that the outer clutch member 65 will engage the hub of the gear 63. The shaft 79 will then be rotated so as to pull the arm 23 inward. When the tree or vine has been passed, the arm 82 tends to swing outward under the influence of the spring 74 and the parts are swung into the position shown in Fig. 2$^a$, whereupon the direction of rotation of the shaft 79 will be reversed and the arm 23 pushed outward. When the arm 82 thus swings outward, the stop 97 engages the inner side of the tooth 93 and arrests the movement of the arm 82 relative to the arm 23 so that further outward movement, due to the reversed action of the shaft 79, will swing both arms. When the arm 23 reaches the outer limit of its movement, the tooth 93 will be thrown into engagement with the notch 91 by the spring 92$^a$ and thereby bring the arm 23 to rest so that it can move neither inward nor outward until the finger 84 meets another obstruction. Just before the arm 23 comes to rest, the angularly projecting stop arm 88, mounted to swing with the arm 82, engages the stop 89 on one of the flanges 49$^a$ and thereby arrests the outward movement of the arm 82. The slight additional outward movement of the arm 23 carries the lever 70 against the link 83, which is then stationary, so that the said lever will be swung about its fulcrum just enough to move the clutches to the neutral position shown in Fig. 2. When the latch engages the notch 91, it locks the arms 23 securely against all lateral motion either inward or outward until the member 84 is again moved inward by engagement with a vine and again releases the tooth 93 from the notch 91, as just explained.

It will be seen from the foregoing that as the tractor is moved along the avenue between the rows of vines or trees, the middle portion of the avenue will be cultivated by means of the rotary plow D and that the lateral portions of the avenue and the space between the trees of a row will be cultivated by the lateral cultivators F, so that there will be no portion of the avenue left uncultivated. As the cultivators F approach a vine or a tree, they will be automatically drawn inward until the finger 84 passes the vine or tree, whereupon the arm 82 will again move outward under the action of the spring 74 and cause the clutches to be so shifted as to reverse the movement of the shaft 79 and force the arm 23 outward until checked by the limiting means heretofore described.

In Fig. 4 is shown a diagrammatic view, the position of the cultivators F being illustrated at the moment that the arms 84 have reached each a tree or vine E. It will be seen that heretofore these lateral cultivators have cultivated the space $x$ on either side of the space $v$ about to be cultivated by the plow D, but that they have not cultivated a strip $y$ between the lines of trees and beyond such line. This strip $y$ in Figs. 4, 5 and 6 is supposed to have been cultivated once by a previous passage of the tractor and cultivators down in adjacent avenue and hence in this strip $y$ the cultivators have operated twice as is shown by the cross-hatching. As soon as the fingers 84 strike the trees or vines E, the cultivators are drawn inward as shown in Fig. 5 so as to clear the vines or trees and then projected again as shown in Fig. 6, thus leaving a small space around each vine or tree which is uncultivated. The diameter of this uncultivated space around the vine or tree will depend upon the distance that the fingers 84 project beyond the extremities of the cultivators F.

It will be seen that all the gears in my mechanism are inclosed in dust-proof, oil-containing boxes, and that the construction is such that the parts are compactly arranged and entirely inclosed.

What I claim is:

1. A cultivator including a main frame, an earth-working element carried by the frame and mounted for travel therewith in a fixed path, and cultivators pivotally mounted upon the frame at their inner ends for lateral movement and extending laterally on opposite sides of the frame, the cultivators being free and unsupported at their outer ends and each cultivator being independent of the other cultivator at all times and movable at its outer end laterally and longitudinally relative to the main frame without changing the direction of travel of the main frame or of the other cultivator.

2. The combination of a frame, a cultivator pivotally mounted on the frame and projecting laterally therefrom, a finger projecting from the frame in advance of the cultivator and movable laterally independently of the cultivator, and means on the frame controlled by said finger for positively retracting the cultivator when the finger meets an obstruction and positively projecting the same when the obstruction has been passed.

3. In a cultivator, a frame, a ground-treating member mounted for swinging movement on the frame, means for operating the ground-treating member, and a guide finger operatively connected at its inner end with the said operating means, said finger being free except at its inner end and having its outer end extending in a path parallel with the line of travel of the cultivator and actuating the operating means by contact with an obstruction to retract the ground-treating member.

4. In a cultivator, a frame, a ground-treating member mounted for swinging movement on the frame, means for operating the ground-treating member, and a guide finger operatively connected at its inner end with the operating means and extending at all times in spaced relation to the free end of the ground-treating member, said guide finger being free except at its inner end and being actuated by contact with an obstruction to cause said operating means to retract the ground-treating member.

5. In a cultivator, a frame, a ground-treating member mounted for swinging movement on the frame, means for operating the ground-treating member, and a guide finger operatively connected at its inner end with the operating means and actuated by contact with an obstruction to cause said means to retract the ground-treating member, said guide finger being free except at its inner end and in advance of the ground-treating member.

6. In a cultivator, a frame, a ground-treating member mounted for swinging movement on the frame and movable laterally to extended and retracted positions, means for operating the ground-treating member, and a relatively thin guide finger having its inner end operatively connected with the operating means and its outer end extended rearwardly in spaced parallel relation to the ground-treating member and mounted for travel in a path substantially parallel with the line of travel of the frame, said finger being free except at its inner end.

7. In a cultivator, a frame, a ground-treating member mounted for swinging movement on the frame and movable to extended and retracted positions, means for operating the ground-treating member, and a guide finger operatively connected at its inner end with the operating means and otherwise free and extending laterally from the frame in advance of and in spaced relation to the ground-treating member.

8. A cultivator comprising a supporting frame, a laterally projecting cultivator shiftably supported on said frame, power-driven means on the frame for shifting the cultivator first toward and then from the main frame, and means projecting from the main frame for automatically setting in action said power-driven means by contact with an obstruction.

9. A cultivator comprising a supporting frame, a laterally projecting rotatable cultivator shiftably supported on said frame, and normally inactive power-driven means for automatically shifting the cultivator first inward upon the approach of the same toward an obstacle and then outward after the obstacle has been passed.

10. A cultivator having a medially disposed supporting frame, oppositely disposed laterally projecting rotatable cultivators supported on said frame, means for positively rotating the cultivators, power-driven means for shifting said cultivators inwardly and outwardly toward and from the supporting frame, and means projecting from the frame to impinge against an obstruction and thereby set in action said power-driven means whereby to shift the cultivators first inward and then outward without changing the direction of travel of the supporting frame.

11. A cultivator comprising a medially disposed main frame, oppositely disposed cultivators shiftably mounted upon the main frame and projecting laterally therefrom, power-driven means for positively shifting each cultivator inward toward or outward from the main frame without changing the direction of travel of said frame, and guide fingers in advance of the cultivators pivoted at their inner ends and operatively connected at said ends with the power-driven means and free except at their inner ends, the outer portions of the guide fingers being arranged to impinge against an obstruction and ride around the same to release and then arrest the power-driven means.

12. The combination with a medially disposed plow, of laterally projecting cultivators, power-driven means for positively swinging said cultivators toward the central line of travel to pass an obstruction without changing the direction of travel of the plow, and means in advance of and free of the cultivators and actuated by contact with an obstruction for controlling said power-driven means.

13. The combination with a rotary plow, and a frame supporting the same, of a rotary cultivator shiftably mounted upon the frame and projecting laterally therefrom, power-driven means for laterally shifting said cultivator first toward and then from the line of draft of the plow, and freely supported devices on the main frame in advance of the cultivator arranged to impinge against an obstruction for controlling said power-driven means.

14. In a cultivator of the character described, a main frame, a driving shaft thereon, an arm pivotally mounted at its front end upon said supporting frame for movement in a horizontal plane, a rotary cultivator mounted upon the rear end of the arm and having its axis projecting laterally therefrom, means operatively connected with the driving shaft for operating the rotary cultivator from the main frame, and means for shifting the rear end of the arm laterally with respect to the main frame.

15. In a cultivator of the character described, a main frame, an arm pivotally mounted thereon for lateral movement in a horizontal plane, a cultivator mounted upon the free end of the arm, a member operatively connected to the arm and projecting laterally to a point in advance of the cultivator, said member being freely movable inward upon engagement with an obstacle and freely movable outward upon disengagement from an obstacle, and operating means connected with said arm and set in action by movement of said member to swing said arm about its pivotal mounting.

16. In a cultivator of the character described, a main frame, an arm mounted thereon for pivotal movement in a horizontal plane, a rotatable cultivator mounted upon the free end of the arm, means for driving said cultivator, and means disposed in conjunction with said cultivator and in advance thereof and operatively connected to the arm to cause a retraction of the arm upon the engagement of said means with an impediment and to permit the projection of said arm and the cultivator upon the release of said means from its engagement with the impediment.

17. In a cultivator of the character described, a main frame, an arm pivotally mounted thereon for movement in a horizontal plane, a cultivator mounted upon the free end of the arm, a finger projecting laterally with respect to said arm to a point in advance of the cultivator, said finger being freely movable independent of the arm inward upon its engagement with an obstacle and outward upon disengagement therefrom, a continuously rotatable driving shaft carried by the arm, a screw shaft, a fixed nut with which the screw shaft engages, and means controlled by said finger for operatively connecting the screw shaft with the driving shaft.

18. In a cultivator of the character described, a main frame, an arm pivotally mounted thereon for movement in a horizontal plane, a cultivator mounted upon the free end of the arm, a finger projecting laterally with respect to said arm to a point in advance of the cultivator, said finger being freely movable independently of the arm inwardly upon its engagement with an obstacle and outwardly upon disengagement therefrom, and means controlled by said finger for positively shifting the cultivator laterally in both directions.

19. In a cultivating mechanism, a main supporting frame, a frame mounted thereon for lateral movement, a cultivator carried by the laterally movable frame, a screw shaft, a member carried by the laterally movable frame and adapted to engage an obstruction and when so engaged to shift in one direction and when disengaged to shift in the other direction, means for rotating the screw shaft, and means controlled by the shifting of the said member to determine the direction of rotation of the screw shaft.

20. In a cultivator of the character described, a main frame, an arm pivotally mounted thereon for lateral movement in a horizontal plane, a cultivator mounted upon the free end of the arm, a driving shaft carried upon said frame, a transversely extending screw shaft also carried upon the frame, a nut upon the main frame with which the screw shaft engages, a member operatively mounted upon the pivotally mounted arm and projecting laterally to a point in advance of the cultivator, said member being freely movable inward upon engagement with an obstacle and freely movable outward upon disengagement from an obstacle, means actuated by an inward movement of the member for operatively connecting the screw shaft to the driving shaft for rotation in one direction and by the outward movement of the member for rotating said screw shaft from the drive shaft in the opposite direction, and means for normally holding said screw shaft entirely disengaged from the driving shaft.

21. In a cultivator of the character described, a main frame, an arm pivotally mounted thereon for lateral movement in a horizontal plane, a cultivator mounted upon the free end of the arm, an operating shaft mounted upon the supporting frame and having a gear wheel at one end, a transversely extending screw shaft mounted upon the supporting frame, a nut with which the screw shaft engages, oppositely disposed gear wheels engaging the first named gear wheel, oppositely disposed clutches shiftable into and out of engagement with the respectively adjacent gear wheels to operatively connect them one at a time to the screw shaft, an arm pivotally mounted upon the supporting frame normally extending parallel with said first named arm but independently movable with relation thereto, a finger extending out from said second arm and adapted to contact with an obstacle to shift the arm inward, clutch shifting levers, means operatively connecting said last named arm with said clutch shifting levers to thereby shift the clutches in one direction upon an inward movement of the last named arm and in an opposite direction upon an outward movement of the last named arm to thereby reverse the movement of the screw shaft, and means for shifting both clutches out of engagement with their respective gear wheels upon a movement of the first named arm into a predetermined relation to the second named arm.

22. In a cultivator of the character described, a main frame, a tubular arm pivotally mounted thereon for lateral movement in a horizontal plane, a rotatable cultivator mounted upon the free end of the arm, a shaft passing longitudinally through the tubular arm operatively engaged at one end with driving mechanism and at the other end operatively engaged with the cultivator, a member operatively connected to the arm and projecting laterally to a point in advance of the cultivator, said member being freely movable inward relative to the arm upon engagement with an obstacle and freely movable outward relative to the arm upon disengagement from an obstacle, means adapted to be operatively engaged with the shaft within the arm to thereby shift the arm either outward or inward, and means actuated by an inward or outward movement of the member for operatively engaging said shaft with said means.

23. In a cultivator, a main frame, an arm pivotally mounted thereon for lateral movement in a horizontal plane, a shaft disposed at the pivotal axis of said arm, means on the main frame for constantly driving said shaft, a shaft disposed within the arm longitudinally thereof and driven from said first named shaft, a rotatable cultivator mounted upon the extremity of the arm, means for driving said cultivator from the second named shaft, and means for automatically shifting the arm and cultivator inward upon the near approach of the cultivator to an obstacle and for automatically shifting the arm and cultivator outward when the cultivator has passed the obstacle.

24. In a cultivator of the character described, a main frame, a supporting member pivotally connected to the main frame for movement in a vertical plane, a driving shaft passing through said member at the pivotal axis thereof, a gear wheel mounted upon said shaft, a vertical shaft supported by said member and having a gear wheel engaging the first named gear wheel, an arm pivotally mounted upon said member for movement in a horizontal plane, the pivotal axis of said arm being coincident with the axis of said vertical shaft, a laterally projecting cultivator mounted upon the extremity of the arm, a shaft carried by said arm and operatively connected to the vertical shaft, means for rotating said supporting member upon its pivot to thereby raise or lower the free end of the arm and the cultivator supported thereby, and means for automatically retracting said arm upon the near approach of the cultivator to an obstacle and for projecting said arm upon the passage of the cultivator beyond said obstacle, said means being operatively connected with the shaft in said arm.

25. In a cultivator of the character described, a main frame, a supporting member pivotally connected to the main frame for movement in a vertical plane, a driving shaft passing through said member at the pivotal axis thereof, a gear wheel mounted upon said shaft, a vertical shaft supported by said member and having a gear wheel engaging the first named gear wheel, an arm pivotally mounted upon said member for movement in a horizontal plane, the pivotal axis of said arm being coincident with the axis of said vertical shaft, a laterally projecting cultivator mounted upon the extremity of the arm, a shaft carried by said arm and operatively connected to said vertical shaft, means for rotating said supporting member upon its pivot to thereby raise or lower the free end of the arm and the cultivator supported thereby, a transmission shaft extending parallel to the shaft on the arm, means for driving said transmission shaft from the shaft on the arm, a screw shaft extending approximately at right angles to the transmission shaft, shiftable means operatively connecting the screw shaft with the transmission shaft and shiftable to drive the screw shaft in one or the opposite direction, a member carried upon the arm and extending out into position to be struck by an obstacle toward which the cultivator is approaching, means actuated by an inward movement of the member for operatively connecting the screw shaft to the transmission shaft for movement of the screw shaft in one direction to cause a retraction of the arm, means actuated by an outward movement of the said member for operatively connecting the transmission shaft to the screw shaft to cause a reverse movement of the screw shaft to thereby project the arm, and means operating to operatively disconnect said transmission shaft from the screw shaft after the arm has moved out a predetermined distance.

26. In mechanism of the character described, a main frame, power operated mechanism supported thereby, an arm pivotally mounted upon the main frame for movement in a horizontal plane, a cultivator mounted upon the free extremity of the arm, means for locking said arm in predetermined relation to the main frame, a pivoted member coacting with said arm and having a portion thereof projecting in front of the cultivator and adapted to be struck by an obstacle in the advance of the mechanism, means actuated by an inward movement of the member for connecting the arm to said power operated mechanism and causing the free end of the arm to move inward, means operated by the disengagement of said member with an obstacle, reversing the movement of said power operated means to thereby cause a projection of the arm and the cultivator, and means operated upon the projection of the arm to a predetermined distance causing the disengagement of the power operated means with the arm, said locking means then operating to hold the arm fixed from either outward or inward movement.

27. In a mechanism of the character described, a main frame, an arm pivoted thereto for movement in a horizontal plane, a cultivator mounted upon the extremity of the arm, a shaft passing through the arm, means mounted on the main frame for continuously rotating said shaft, a transmission shaft mounted upon the arm and constantly driven from the first named shaft, a bevel gear wheel mounted upon the transmission shaft, a clutch shaft mounted upon the arm at right angles to the transmission shaft and having oppositely disposed loose bevel gear wheels engaging the first named bevel gear wheel, oppositely disposed clutch members shiftably mounted upon the last named shaft and engageable each with its corresponding bevel gear wheel, a screw shaft, a nut through which the screw shaft passes, said screw shaft being connected to the clutch shaft by a universal joint, a T-shaped lever mounted upon the arm, shipper levers connected one to each clutch member, links connected between the arms of the T-shaped lever and said clutch levers whereby a full reciprocation of the T-shaped lever in one or the other direction will throw one or the other of the clutches in or out, a spring engaging said T-shaped lever and normally urging one of said clutches into engagement and the main arm of the T-shaped lever outward, a pivotally mounted arm extending approximately parallel to the first named arm, a link connecting said arm with the main arm of the T-shaped lever, an angular finger mounted upon said second named arm and having its extremity disposed in advance of the end of the cultivator, and means attached to the second named arm and to the main frame for limiting the outward movement of the second named arm relative to the main frame.

28. In a mechanism of the character described, the combination of a support, a carrying arm pivotally mounted upon the support for movement in a horizontal plane, a ground treating implement carried by said arm, a second arm mounted upon the support for movement in a horizontal plane and having a member projecting laterally therefrom, operative connections whereby when the said laterally projecting member meets an obstruction both said arms will be swung inwardly and when said laterally projecting member passes said obstruction both said arms will swing outwardly, a latch mounted upon the said carrying arm and adapted to engage the support to normally hold said arm against inward or outward movement, and a trip carried by the second arm and constantly engaging said latch whereby to release the same upon initial inward movement of said arm.

29. The combination of a support, a carrying arm mounted thereon for pivotal movement in a horizontal plane, a ground treating implement carried by said arm, a second arm pivotally mounted on the support for horizontal movement, operative connections whereby movement of the said second arm will be transmitted to the carrying arm, a stop upon the support, and a stop arm disposed angularly with respect to said second arm and movable therewith to engage the said stop.

In testimony whereof I affix my signature in presence of two witnesses.

OLIVER WARREN JOHNSON. [L. S.]

Witnesses:
FRED WINDISCH,
W. REID ALLEN.